(12) United States Patent
Xiao

(10) Patent No.: US 11,797,170 B2
(45) Date of Patent: Oct. 24, 2023

(54) METHOD FOR ACQUIRING HISTORICAL INFORMATION, STORAGE MEDIUM, AND SYSTEM

(71) Applicant: BOE TECHNOLOGY GROUP CO., LTD., Beijing (CN)

(72) Inventor: Ming Xiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 17/435,142

(22) PCT Filed: Mar. 9, 2021

(86) PCT No.: PCT/CN2021/079719
§ 371 (c)(1),
(2) Date: Aug. 31, 2021

(87) PCT Pub. No.: WO2021/213038
PCT Pub. Date: Oct. 28, 2021

(65) Prior Publication Data
US 2022/0326845 A1   Oct. 13, 2022

(30) Foreign Application Priority Data
Apr. 23, 2020   (CN) .......................... 202010325731.9

(51) Int. Cl.
*G06F 3/048*   (2013.01)
*G06F 3/04855*   (2022.01)
*G06F 3/04847*   (2022.01)

(52) U.S. Cl.
CPC ...... *G06F 3/04855* (2013.01); *G06F 3/04847* (2013.01)

(58) Field of Classification Search
CPC .......................... G06F 3/04855; G06F 3/04847
See application file for complete search history.

(56) References Cited

U.S. PATENT DOCUMENTS

| | | | | |
|---|---|---|---|---|
| 8,977,982 | B1 * | 3/2015 | Amacker | G06F 3/014 715/786 |
| 2005/0008264 | A1 * | 1/2005 | Iida | G06F 16/58 707/E17.026 |
| 2009/0046584 | A1 * | 2/2009 | Garcia | G06F 16/958 370/233 |
| 2012/0167010 | A1 * | 6/2012 | Campbell | G06F 16/358 715/825 |

(Continued)

FOREIGN PATENT DOCUMENTS

| | | | | |
|---|---|---|---|---|
| CA | 2841292 A1 * | 7/2014 | ............ | G06F 16/14 |
| CN | 103279276 A  * | 9/2013 | | |

(Continued)

*Primary Examiner* — Rashawn N Tillery
(74) *Attorney, Agent, or Firm* — Lippes Mathias LLP

(57) ABSTRACT

Provided is a method for acquiring historical information. The method includes displaying, in response to a first target operation received on an information display page, a content finder control on the information display page; determining, in response to a second target operation on the content finder control, key information corresponding to historical information to be found; acquiring historical information associated with the key information based on the key information; and displaying the historical information.

12 Claims, 13 Drawing Sheets

(56) References Cited

U.S. PATENT DOCUMENTS

2014/0245214 A1\* 8/2014 Singh .................... G06F 3/0484
715/780
2016/0202889 A1\* 7/2016 Shin ...................... G06F 3/0488
715/758

FOREIGN PATENT DOCUMENTS

| CN | 103279276 A | 9/2013 | |
|---|---|---|---|
| CN | 106527888 A | 3/2017 | |
| CN | 110955374 A | 4/2020 | |
| CN | 111552859 A | 8/2020 | |
| EP | 2568371 A2 \* | 3/2013 | ....... G06F 17/30905 |
| WO | WO-2016114444 A1 \* | 7/2016 | ........... G06F 3/0482 |

\* cited by examiner

METHOD FOR ACQUIRING HISTORICAL INFORMATION, STORAGE MEDIUM, AND SYSTEM

CROSS-REFERENCE TO RELATED APPLICATION

This application is a 371 of PCT Application No. PCT/CN2021/079719, filed on Mar. 9, 2021, which claims priority to Chinese Patent Application No. 202010325731.9, filed on Apr. 23, 2020 and entitled "METHOD FOR ACQUIRING HISTORICAL INFORMATION, STORAGE MEDIUM, AND SYSTEM", the disclosure of which is herein incorporated by reference in its entirety.

TECHNICAL FIELD

The present disclosure relates to the field of computer technologies, and in particular, relates to a method for acquiring historical information, a storage medium, and a system.

BACKGROUND

With the rapid development of computer technologies, a series of smart terminal devices (such as mobile phones) capable of bringing convenience to users emerge. A user may acquire the information that the user wants to acquire in time through the smart terminal device.

SUMMARY

The content of the present disclosure is provided to introduce some of the embodiments further described in the detailed description below. Embodiments of the present disclosure provide a method for acquiring historical information, a storage medium, and a system to at least implement quickly finding target information in the historical information.

Optionally, a method for acquiring historical information is provided. The method includes:
 displaying, in response to a first target operation received on an information display page, a content finder control on the information display page;
 determining, in response to a second target operation on the content finder control, key information corresponding to historical information to be found;
 acquiring historical information associated with the key information based on the key information; and
 displaying the historical information.

Optionally, the content finder control includes: a navigation bar displaying one or more first candidate key information; the second target operation includes: a first touch operation performed on the navigation bars to select one or more of the candidate key information; and
 determining, in response to the second target operation on the content finder control, the key information corresponding to the historical information to be found includes:
 determining, in response to the first touch operation, the first candidate key information selected by the first touch operation as the key information corresponding to the historical information to be found.

Optionally, the first touch operation includes: selecting the candidate key information in a click mode or a sliding mode.

Optionally, at least one of the navigation bars includes: a plurality of navigation directories at different levels, wherein a plurality of first candidate key information of the same category are displayed in the navigation directory at each level, and the category of the first candidate key information displayed in the navigation directory at each level is a subcategory of a category of the first candidate key information displayed in the navigation directory at a previous level:
 displaying, in response to the first target operation received on the information display page, the content finder control on the information display page includes:
 displaying, in response to the first target operation received on the information display page, the navigation directory at a first level; and
 the method further includes:
 displaying, in response to a second touch operation on the navigation directory at any level among the plurality of navigation directories at different levels, the navigation directory at a next level.

Optionally, the second touch operation includes: a click operation or a combined operation on any one of the first candidate key information displayed in the navigation directory at any level;
 wherein the combined operation includes: a long pressing operation, and a sliding operation in a direction that intersects an arrangement direction of the plurality of first candidate key information displayed in the navigation directory at any level.

Optionally, the category of the first candidate key information displayed in the navigation directory at each level includes: a post time of the historical information.

Optionally, each of the navigation bars includes two navigation directories at different levels;
 wherein a category of each of the plurality of first candidate key information displayed in the navigation directory at the first level is: a post year of the historical information; and
 a category of each of the plurality of first candidate key information displayed in the navigation directory at a second level is: a post month of the historical information.

Optionally, before displaying the content finder control on the information display page, the method further includes:
 sending, in response to the first target operation, an acquisition request to a server, wherein the acquisition request is configured to instruct the server to acquire the plurality of first candidate key information; and
 receiving the plurality of first candidate key information sent by the server.

Optionally, the information display page includes: a scroll bar; and the first target operation is a third touch operation on the scroll bar.

Optionally, the third touch operation includes any one of a click operation, a long pressing operation, and a sliding operation.

Optionally, after acquiring the historical information associated with the key information based on the key information, the method further includes:
 hiding the navigation bars.

Optionally, hiding the navigation bars includes:
 hiding the navigation bar in response to a touch operation on a position on the information display page other than on a position of the navigation bar;

or, hiding the navigation bar in the case that a duration during which no touch operation is performed on the information display page is detected to be greater than a duration threshold.

Optionally, the content finder control includes: a search window; the second target operation is an operation performed on the search window; and determining, in response to the second target operation on the content finder control, the key information corresponding to the historical information to be found includes:

determining, in response to the second target operation, information received in the search window as the key information.

Optionally, the search window includes at least one of the following search sub-windows:

a content search sub-window configured to receive content information of posted historical information, the content information including at least one of a keyword and a picture;

a time search sub-window configured to receive a post time of the historical information;

a user identification search sub-window configured to receive a user identity posting the historical information; and a type search sub-window configured to receive a post type of the historical information, the post type of the historical information including at least one of a picture type, a text type, and a voice type.

Optionally, the second target operation includes: an information input operation performed in the search window; or, the second target operation includes: a fourth touch operation and a fifth touch operation; and determining, in response to the second target operation, the information received in the search window as the key information includes:

displaying, in response to the fourth touch operation performed in the search window, a plurality of second candidate key information; and displaying, in response to the fifth touch operation on any second candidate key information of the plurality of second candidate key information, the second candidate key information in the search window, and determining the second candidate key information as the key information.

Optionally, the first target operation includes: a page-turning operation performed on the information display page at a speed greater than a speed threshold.

Optionally, acquiring the historical information associated with the key information based on the key information includes:

sending the key information to a server, the key information being configured to instruct the server to find the historical information associated with the key information based on the key information; and receiving the historical information sent by the server.

Optionally, a non-volatile computer-readable storage medium is provided. The computer-readable storage medium stores at least one instruction therein. The computer-readable storage medium, when operating on a computer, enables the computer to perform the method for acquiring the historical information as defined in any one of the embodiments described above.

Optionally, a system is provided. The system includes: a processor and a touch display, wherein the touch display is configured to: display an information display page; receive a first target operation of a user on the touch display; display a content finder control on the information display page; receive a second target operation of the user on the touch display; and display historical information found; and the processor is configured to: display, in response to the first target operation, the content finder control on the information display page; determine, in response to the second target operation on the content finder control, key information corresponding to historical information to be found; acquire historical information associated with the key information based on the key information; and display the historical information on the touch display.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the conception of the present disclosure claimed by the embodiments of the present disclosure will be described in detail with reference to the accompanying drawings and some embodiments.

In the related art, in order to view and acquire historical information on an information display page, a user may continuously perform page-turning operations on the information display page until the page displaying the historical information that the user wants to acquire is found. However, the efficiency of turning the pages to find the historical information is low.

Figure 1:
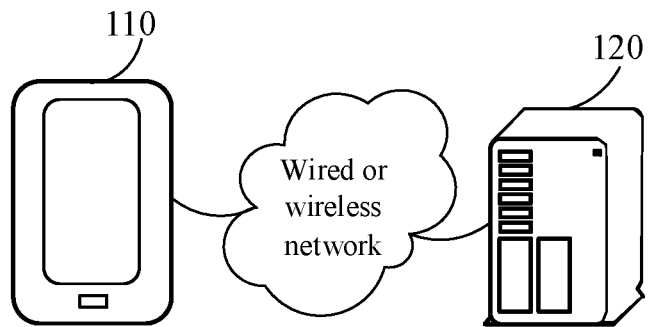
FIG. 1 is a schematic diagram of an implementation environment involved in a method for acquiring historical information according to one or more embodiments of the present disclosure.

In one or more embodiments, as illustrated in FIG. 1, a system for finding historical information on a smart terminal device by a user is provided. As illustrated in FIG. 1, the system includes at least one smart terminal device 110 installed with a client (FIG. 1 only illustrates one smart terminal device 110), and a server 120 connected to the at least one smart terminal device 110. For example, referring to FIG. 1, the smart terminal device 110 illustrated therein may be connected to the server 120 over a wired network or a wireless network. The "at least one" refers to one or more, and the "more" refers to two or more.

Exemplarily, the client may be an application client including an information display page, such as a social client, an instant messaging client, a multimedia player client, a web page presentation client, or the like. The smart terminal device 110 may be a smart interactive device such as a smartphone, a tablet computer, a desktop computer, a notebook, and an electronic whiteboard. FIG. 1 illustrates the case where the smart terminal device 110 is a smartphone as an example. The server 120 may be a background server (also referred to as a back-end server) of the client installed in the smart terminal device 110. Moreover, the server 120 may be a server, or a server cluster composed of a plurality of servers, or a cloud computing service center.

In some embodiments, the system illustrated in FIG. 1 may be only the smart terminal device per se. That is, the method according to the embodiment of the present disclosure may be executed in an offline environment without a server.

In the embodiment of the present disclosure, if a user wants to quickly find target information in the historical information on the information display page of the client, a first target operation may be performed on the information display page. Here, the client or a processor may display, in response to the first target operation, a content finder control on the information display page for the user to quickly find the historical information, and the user may quickly find the historical information which the user wants to find on the information display page through the content finder control. In addition, the historical information found by the user may be acquired from the server. The processor may be disposed in the smart terminal device illustrated in FIG. 1 or may be disposed in the cloud, which is not limited in the embodiments of the present disclosure.

The first target operation may be a trigger operation that triggers the method for acquiring the historical information according to the embodiment of the present disclosure. The processor receives the trigger operation, determines that a trigger condition is met, and then executes subsequent operations. Moreover, the first target operation may be a first operation of finding the target information, such as a first operation of finding the historical information.

The method for acquiring the historical information according to the embodiment of the present disclosure may relatively quickly and accurately locate the historical information that the user wants to find, that is, with high finding efficiency; and meanwhile, may reduce the operation of the user to find a target content in some cases, thereby effectively improving the convenience of user operation.

Figure 2:
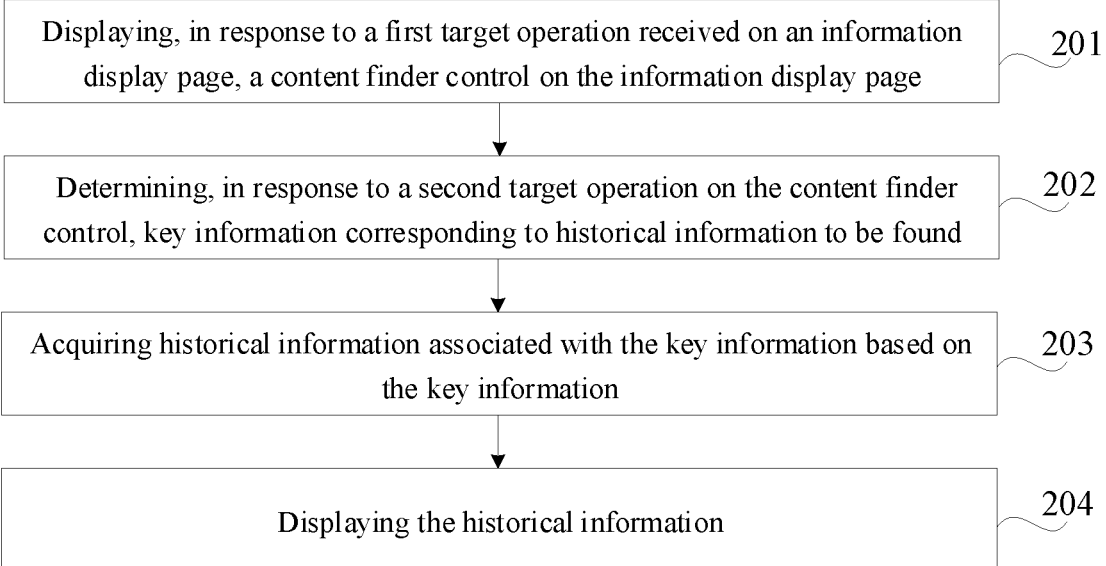
FIG. 2 is a flowchart of a method for acquiring historical information according to one or more embodiments of the present disclosure.

FIG. 2 is a flowchart of a method for acquiring historical information according to an embodiment of the present disclosure. When a corresponding computer program is executed by a processor, the following method steps are implemented.

The processor may be a processor in an electronic device, such as a mobile phone, a palmtop computer, a conference machine, and other smart interactive devices; or the processor may be a server or a cloud processor; or the processor may be a processor in a computer-readable storage medium. Program codes corresponding to the method for acquiring the historical information according to the embodiment of the present disclosure may be executed and implemented by the processor in a memory.

This method may be applied to the client installed in the smart terminal device 110 illustrated in FIG. 1, executed by the processor of the smart terminal device, and implemented in a scenario of the client illustrated in FIG. 1. As illustrated in FIG. 2, the method may include the following steps.

In step 201, a content finder control is displayed on an information display page in response to a first target operation received on the information display page.

The information display page may be a page displayed by the following client. The client may be an application client including an information display page, such as a social client, an instant messaging client, a multimedia player client, or a web page presentation client.

Taking the social client as an example, the client opens a post-processor display page, and a user may perform operations on the page displayed on the display, for example, a chat interface of the social application client, wherein the chat interface includes historical chat information, the historical chat information becoming the historical information.

In some embodiments, when the method for acquiring the historical information claimed by the embodiments of the present disclosure is not used, the content finder control may be hidden, and may be displayed only after being triggered. For example, in the case that the user wants to quickly acquire the historical information of the information display page, the user may first perform the first target operation on the information display page. That is, the client or processor may, in response to the first target operation performed by the user on the information display page of a display screen, determine that the user needs to quickly acquire the historical information, and then, may further display the content finder control on the information display page for the user to quickly find the historical information.

In some embodiments, the content finder control may be displayed directly on the information display page without responding to any trigger operation received on the information display page.

In step 202, key information corresponding to historical information to be found is determined in response to a second target operation on the content finder control.

After the content finder control is displayed on the information display page, the user may perform the second target operation on the content finder control. The second target operation may be configured to allow the client or processor to acquire the key information corresponding to the historical information to be found. That is, the client or the processor may determine the key information in response to the second target operation of the user on the content finder control.

Determining the key information refers to: determining a request of the user for finding information and determining that the request carries key information (such as keywords or related constraints) of the target information to be found. A goal here still refers to finding the historical information, and the second target operation may be a second operation of finding the historical information.

In step 203, historical information associated with the key information is acquired based on the key information.

The client or processor may acquire the historical information associated with the key information from the server or locally based on the acquired key information. For example, assuming that the acquired key information is "posted on Feb. 1, 2017", the finally acquired historical information may be at least one historical information posted on Feb. 1, 2017.

In addition, the above steps 201 to 203 include one of the optional embodiments. In some scenarios, the following step 204 may also be added based on the foregoing embodiments.

In step 204, the historical information is displayed.

After acquiring the historical information, the client or processor may also display the acquired historical information on the information display page for the user to view.

In summary, the embodiments of the present disclosure provide a method for acquiring historical information. The method can display the content finder control on the information display page; determine, in response to an operation on the content finder control, the key information corresponding to the historical information to be found; and quickly acquire the historical information based on the key information. Therefore, the associated historical information may be displayed quickly. With the method, the efficiency in acquiring the historical information is high.

Exemplarily, the content finder control displayed in the information display page may include: a list display component (for example, a navigation bar) displaying one or more first candidate key information, and/or a shortcut operation page, for example, a search window.

Taking the navigation bar as an example, the navigation bar may be used for a user to directly select the key information. That is, in the case that the content finder control is the navigation bar, the client or processor may determine any first candidate key information selected by the user from the one or more first candidate key information displayed on the navigation bar as the key information. The search window may be used for the user to input key information. That is, in the case that the content finder control is the search window, the client or processor may determine the information input by the user in the search window as the key information.

In addition, for different types of clients, the information display page and a type of historical information that the user needs to acquire may be different. For example, assuming that the client is an instant messaging client, the information display page may be a certain chat page, and the historical information may be a certain historical chat record in the chat page. Assuming that the client is a social client or a web client, the information display page may be a social page including information posted by a plurality of users, and the historical information may be a dynamic state posted by a user on the social page. That is, the method for acquiring the historical information according to the embodiment of the present disclosure may be applied to scenarios for finding different historical information, which is not limited in the embodiment of the present disclosure.

An exemplary embodiment is implemented in a scenario of the client installed in the smart terminal device illustrated in FIG. 1 by taking the processor as an execution subject, and introduces the method for acquiring the historical information according to the embodiments of the present disclosure by taking the navigation bar as the content finder control as an example.

Figure 3:
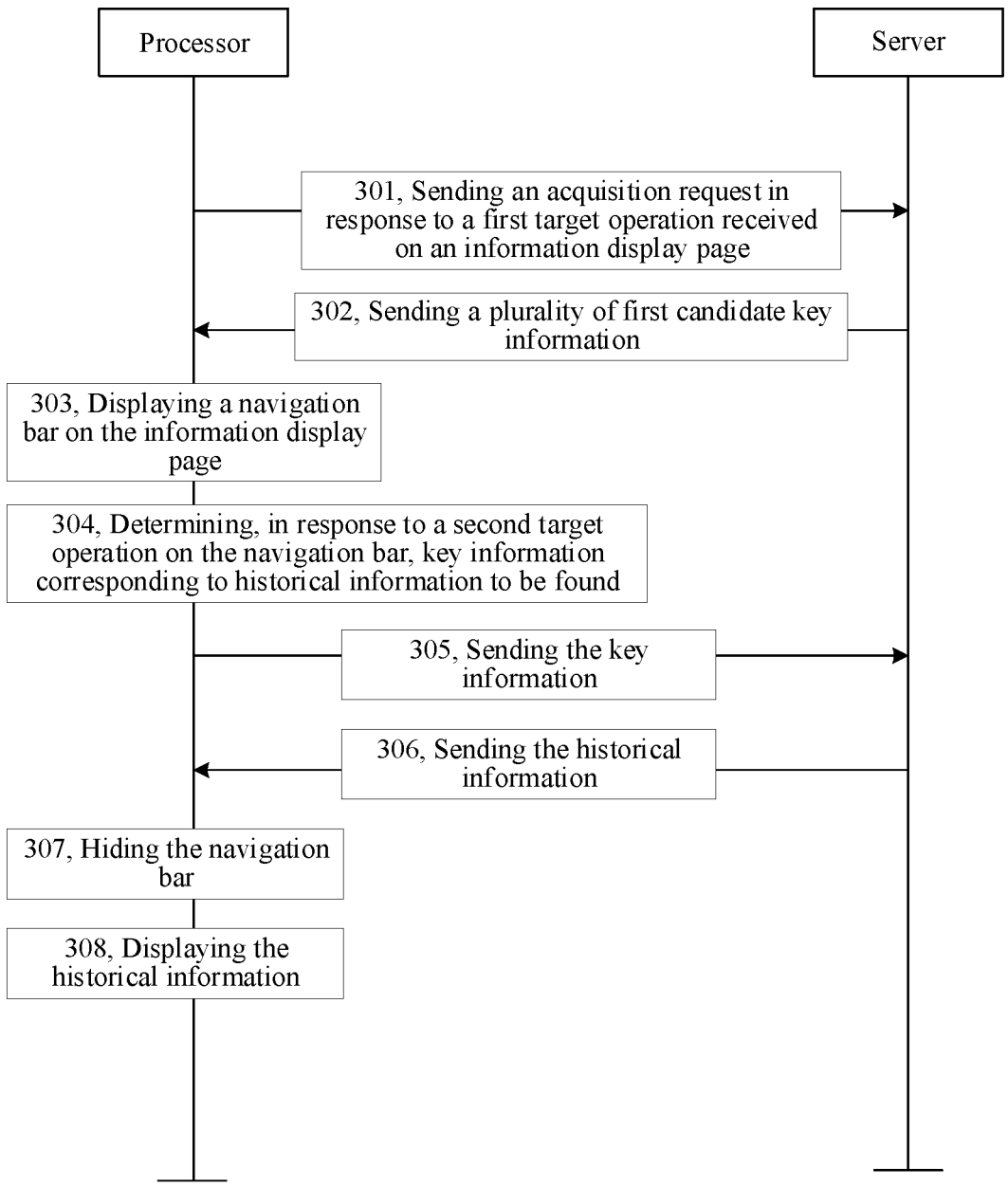
FIG. 3 is a flowchart of a method for acquiring historical information according to one or more embodiments of the present disclosure.

FIG. 3 illustrates a flowchart of another method for acquiring historical information according to an embodiment of the present disclosure. As illustrated in FIG. 3, the method may include the following steps.

In step 301, the processor sends an acquisition request to a server in response to a first target operation received on an information display page.

The acquisition request may be configured to instruct the server to acquire one or more first candidate key information to be displayed on the navigation bar. That is, the processor may, in response to the first target operation performed by a user on the information display page, acquire the first candidate key information from the server in real time.

Figure 4:
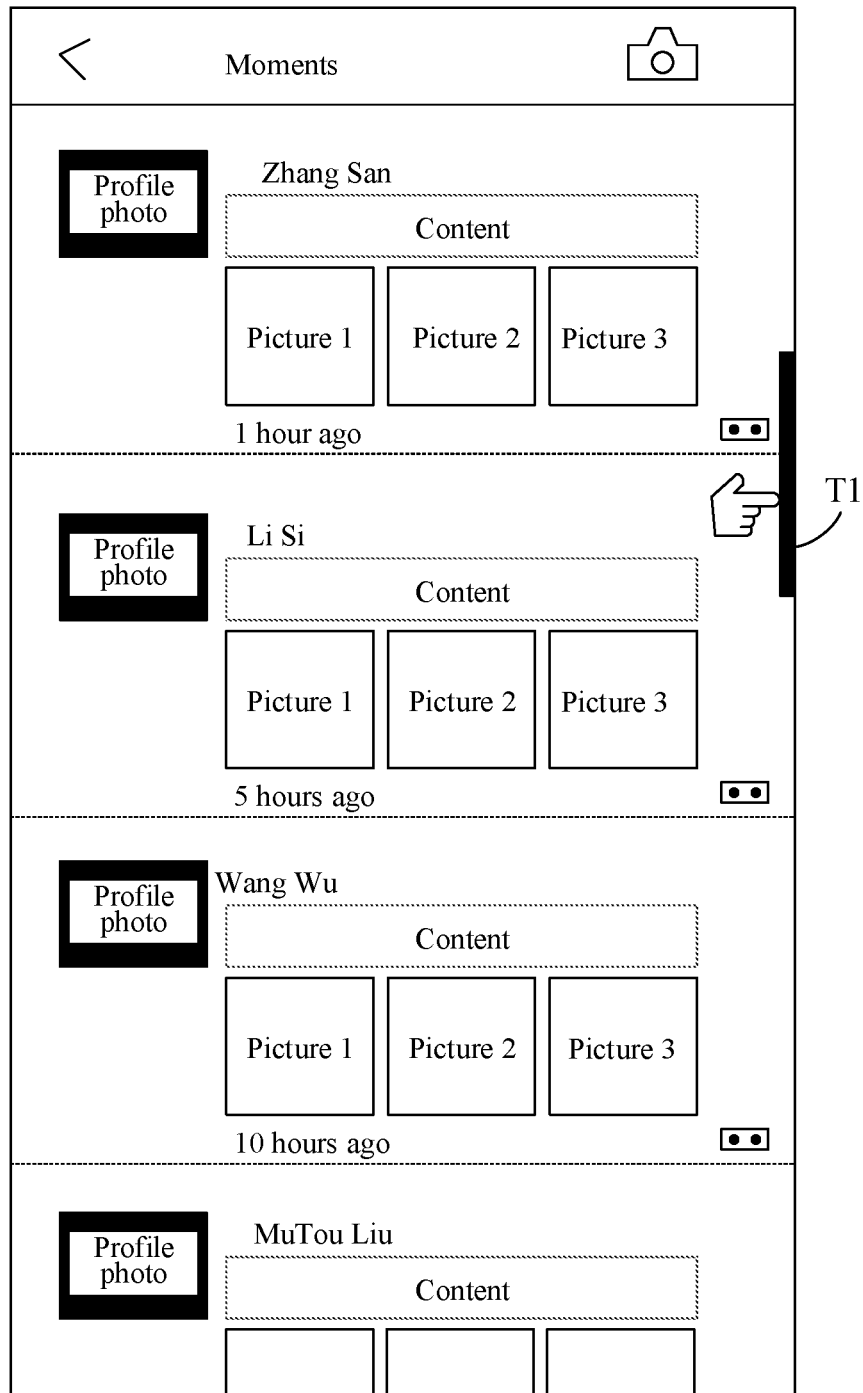
FIG. 4 is a schematic diagram of an interface of an information display page according to one or more embodiments of the present disclosure.

Optionally, FIG. 4 is a schematic diagram of an interface of an information display page according to an embodiment of the present disclosure. As illustrated in FIG. 4, the information display page may be a social page including information posted by a plurality of different users. The information display page not only includes historical information posted by different users (such as Zhang San, Li Si, Wang Wu, and MuTou Liu) at different times, but also includes a scroll bar T1. The first target operation may be a third touch operation for the scroll bar T1, and the third touch operation may include any one of a click operation, a long pressing operation, and a sliding operation. Without doubt, the first target operation is not limited to the above operation mode, for example, the first target operation may also be a voice operation.

Exemplarily, assuming that the third touch operation is the long pressing operation, in the case that a user wants to quickly acquire a certain piece of historical information on the information display page shown in FIG. 4, the user may trigger, by long-pressing the scroll bar T1, the processor to send to the server an acquisition request for instructing the server to acquire the first candidate key information.

It should be noted that the processor may display the scroll bar T1 by default while displaying the information display page on the client; or the processor may, after the client displays the information display page, display the scroll bar T1 on the client in response to a first designated operation (such as a page-turning operation by selecting or sliding) performed by a certain user on the information display page. As the user may not want to quickly acquire the historical information of a certain information display page, the user experience may be effectively improved on the premise of reducing processing resources by displaying the scroll bar T1 after the user performs a certain operation, and sending the acquisition request to the server after the user performs a third touch operation on the scroll bar T1.

In step 302, the server sends a plurality of first candidate key information to the processor.

After receiving the acquisition request sent by the processor, the server may determine, based on a type of the first candidate key information that the processor needs to acquire and all the historical information included in the information display page, a plurality of first candidate key information and send them to the processor.

For example, assuming that the category of the first candidate key information that the processor needs to acquire is a post time of the historical information, the server may determine a plurality of first candidate key information based on the category of "post time of historical information" and specific post time of all historical information included in the information display page. That is, the processor may receive the first candidate key information sent by the server. By receiving the first candidate key information from the server in real time, the storage burden of the processor may be reduced, and the accuracy of the received information is high.

It should be noted that the category (such as a time, a page number, or other scenario tags) of the first candidate key information that the processor needs to acquire may be pre-configured in the server, or may be carried in the acquisition request sent by the processor.

Exemplarily, before executing step 301, the server may determine the first candidate key information in advance and send the same to the processor. That is, a plurality of first candidate key information may be pre-stored in the processor. Correspondingly, when the user performs the first target operation on the information display page, the processor may directly acquire the plurality of first candidate key information without executing the above steps 301 and 302.

In step 303, the processor displays a navigation bar on the information display page.

In the embodiment of the present disclosure, after acquiring the plurality of first candidate key information, the processor may further display the navigation bar including the first candidate key information on the information display page of the client.

Figure 5:
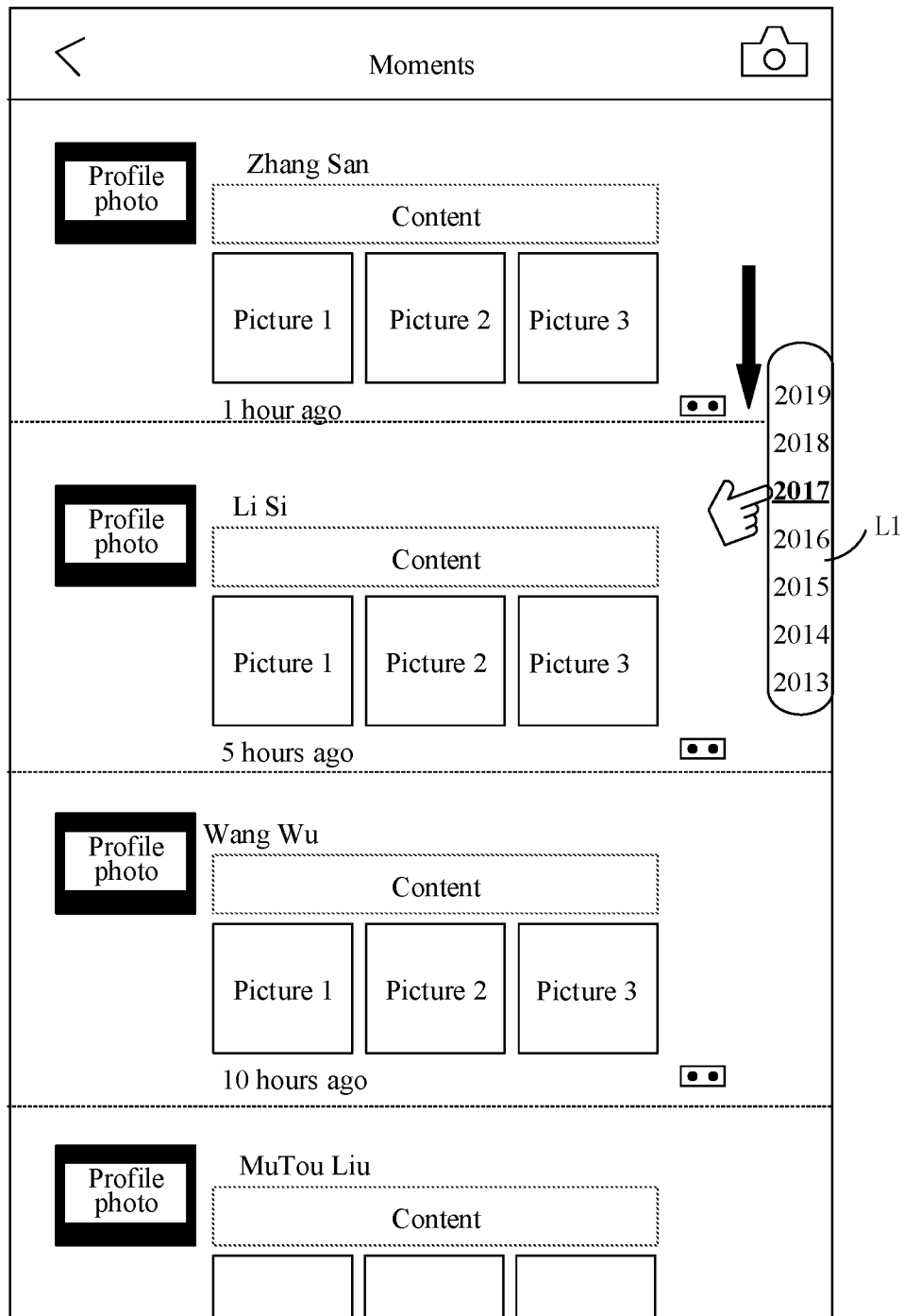
FIG. 5 is a schematic diagram of an interface of an information display page according to one or more embodiments of the present disclosure.

For example, assuming that the first candidate key information acquired by the processor is a post year of the historical information, and a total of 7 post years from 2013 to 2019 are acquired, referring to FIG. 5, the information display page of the client displays a navigation bar L1, which displays a total of 7 pieces of first candidate key information "from 2013 to 2019".

To further improve the efficiency of acquiring the historical information and ensure the acquisition accuracy, at least one navigation bar recited in the embodiment of the present disclosure may include a plurality of navigation directories at different levels. A plurality of first candidate key information of the same category may be displayed in the navigation directory at each level; and the category of the first candidate key information displayed in the navigation directory at each level may be a subcategory of a category of the first candidate key information displayed in the navigation directory at a previous level.

For example, the category of the first candidate key information displayed in the navigation directory at each level may include: the post time of the historical information. Correspondingly, assuming that a category of each of the first candidate key information in the navigation directory at a certain level; the post year of the historical information, a category of each of the first candidate key information displayed in the navigation directory at a next level is: a post month of the historical information. The post month is a subcategory of the post year, and so on.

For another example, the category of the first candidate key information displayed in the navigation directory at each level may include: a post position of the historical information in the information display page. Correspondingly, assuming that a category of each of the first candidate key information in the navigation directory at a certain level is: a post chapter of the historical information, a category of each of the first candidate key information displayed in the navigation directory at a next level is: a post page of the historical information. The post page is a subcategory of the post chapter, and so on.

For still another example, the category of the first candidate key information displayed in the navigation directory at each level may include: the type of the historical information. Correspondingly, assuming that a category of each of the first candidate key information in the navigation directory at a certain level is: a type of "clothing", a category of each of the first candidate key information displayed in the navigation directory at a next level is: a type of "shoes". The type of "shoes" is a subcategory of the type of "clothing", and so on. The three examples above are only schematic illustrations of the category of the first candidate key information.

Figure 6:
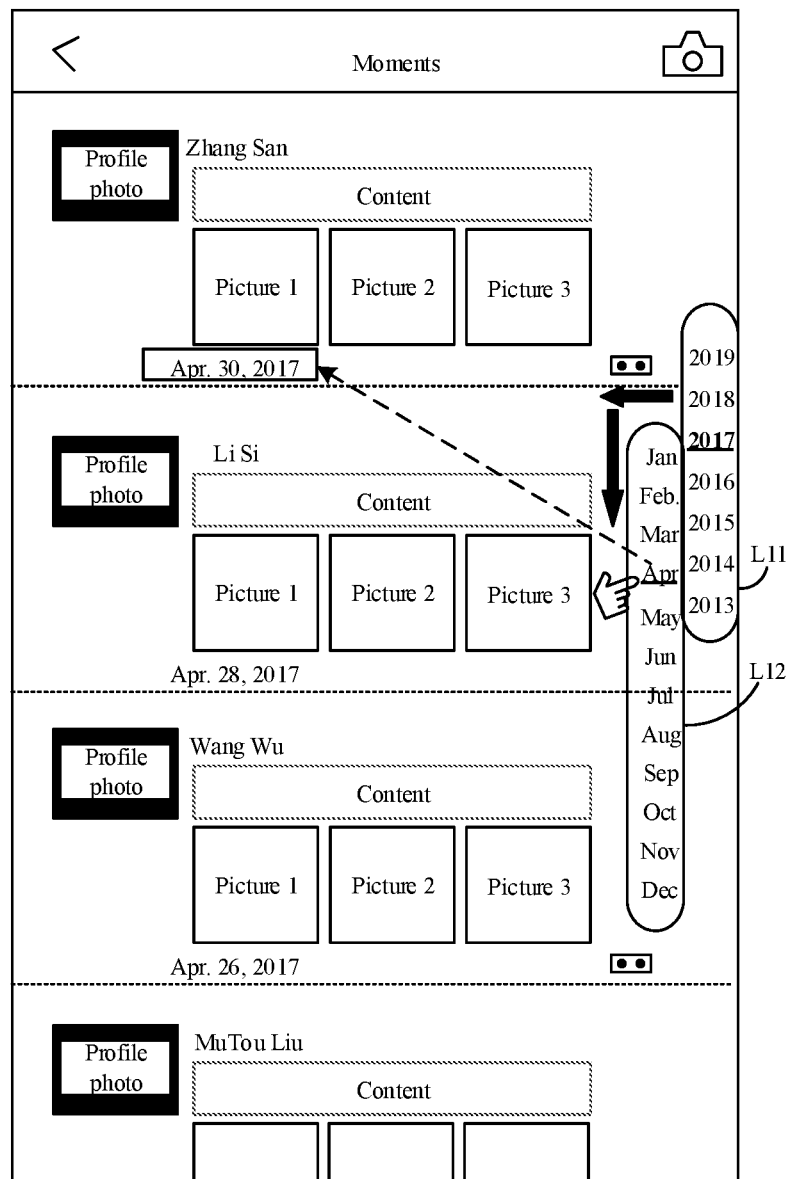
FIG. 6 is a schematic diagram of an interface of an information display page according to one or more embodiments of the present disclosure.

Exemplarily, taking that the category of the first candidate key information displayed in the navigation directory at each level is the post time of the historical information, and the navigation directories include two navigation directories at different levels, namely a first level and a second level, as an example, and FIG. 6 illustrates a schematic diagram of an interface of an information display page.

Referring to FIG. 6, a category of the plurality of first candidate key information displayed in a navigation directory at a first level L11 is: a post year (from 2013 to 2019) of the historical information. A category of the plurality of first candidate key information displayed in a navigation directory at a second level L12 is; a post month (from January to December) of the historical information. The navigation directory at the first level L11 may also be called a first level list, and the navigation directory at the second level L12 may also be called a second level list.

It should be noted that in the case that the navigation bar includes a plurality of navigation directories at different levels, for step 303, the processor may display the navigation directory at the first level in response to the first target operation received on the information display page. After step 303 is executed, the processor may display the navigation directory at the next level in response to a second touch operation on the navigation directory at any level among the plurality of navigation directories at different levels again.

Exemplarily, taking that the first target operation is the third touch operation on the scroll bar displayed on the information display page, and the navigation directories include two navigation directories at different levels as an example, with reference to FIG. 4 and FIG. 6, when a user performs a third touch operation on the scroll bar T1 illustrated in FIG. 4, the processor may display the navigation directory at the first level L11 on the information display page in response to the third touch operation. When the user performs the second touch operation on the navigation directory at the first level, the processor may continue to display the navigation directory at the second level L12 on the information display page in response to the second touch operation. That is, the navigation directory at the first level L11 and the navigation directory at the second level L12 illustrated in FIG. 6 may be sequentially displayed on the information display page.

Exemplarily, the second touch operation may include: a click operation or a combined operation on any one of the first candidate key information displayed in the navigation directory at any level. The combined operation may include:

a long pressing operation, and a sliding operation in a direction that intersects an arrangement direction of the plurality of first candidate key information displayed in the navigation directory at any level. That is, the user may click any first candidate key information among the plurality of first candidate key information displayed on a certain navigation directory, to trigger the processor to further display the navigation directory at the next level corresponding to the first candidate key information. Or, the user may long-press any first candidate key information among the plurality of first candidate key information displayed on a certain navigation directory, and slide from the first candidate key information to a direction that intersects an arrangement direction of the plurality of first candidate key information, to trigger the processor to further display the navigation directory at the next level corresponding to the first candidate key information. Without doubt, the second touch operation is not limited to the above two operation modes, and may also be, for example, a double-click operation.

Exemplarily, assuming that the second touch operation is the combined operation, combined with FIG. 6, when a user slides to the left while long-pressing first candidate key information "2017" displayed on the navigation directory at the first level L11, the information display page may display the navigation directory at a next level, that is, the navigation directory at the second level L12, corresponding to 2017.

In addition, to avoid that the navigation directory occupies a larger display area of the information display page, the processor may hide the navigation directory at the previous level while displaying the navigation directory at the next level, that is, the navigation directory at the previous level is not displayed. Moreover, the first candidate key information targeted by the second touch operation is displayed at a designated position on the navigation directory at the next level. The designated position may be a top, bottom, or side of the navigation directory.

Figure 7:
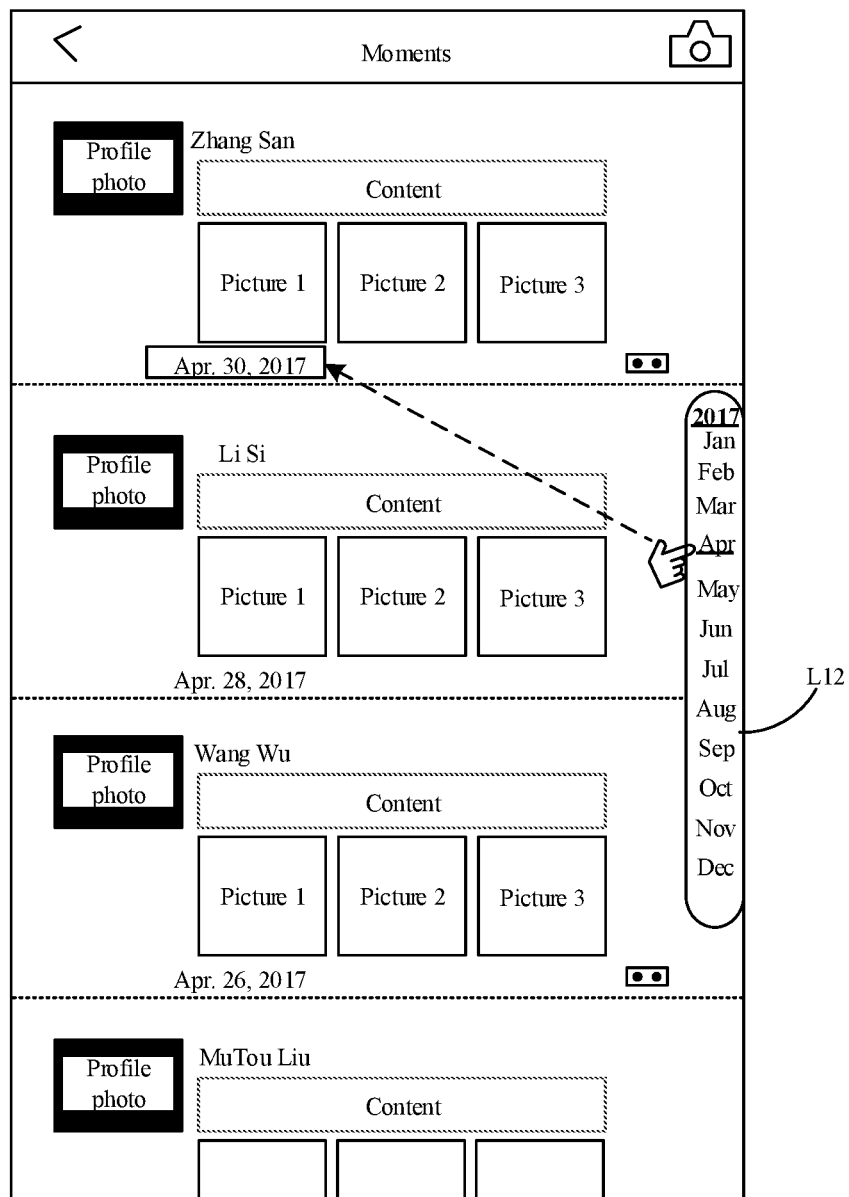
FIG. 7 is a schematic diagram of an interface of an information display page according to one or more embodiments of the present disclosure.

Exemplarily, still taking the second touch operation targeting the first candidate key information 2017 displayed on the navigation directory at the first level L11 illustrated in FIG. 6 as an example, FIG. 7 illustrates a schematic diagram of an interface in which only the navigation directory at the second level L12 is displayed on the information display page. Referring to FIG. 7, it can be seen that "2017" may be displayed on the navigation directory at the second level L12, and may be displayed at the top of the navigation directory.

It should be noted that the processor may hide the scroll bar while displaying the navigation bar. That is, the information display page does not display the scroll bar. Moreover, the navigation bar may be displayed on the information display page in a fixed or floated fashion. When the navigation bar is displayed in the floated fashion, the processor may flexibly adjust a display position of the navigation bar based on a movement operation of the user on the navigation bar.

In step 304, the processor determines key information corresponding to historical information to be found in response to a second target operation on the navigation bar.

Optionally, the second target operation may include: a first touch operation performed by the user on the navigation bar to select one or more candidate key information. The first touch operation may include: selecting the candidate key information in a click mode or a sliding mode. Correspondingly, the processor may determine the first candidate key information selected by the first touch operation as the key information in response to the first touch operation. That is, the first candidate key information displayed in an active region of the first touch operation is determined as the key information. Without doubt, the first touch operation is not limited to the click mode or the sliding mode.

For example, with reference to FIG. 6, assuming that the first touch operation is to select the candidate key information in the click mode, and a user clicks the first candidate key information "2017" on the navigation directory at the first level L11, and clicks the first candidate key information "April" on the navigation directory at the second level L12, the processor may determine the key information to be "April 2017" in response to the clicking.

In 305, the server sends the key information to the server.

The key information may be configured to instruct the server to find the historical information associated with the key information based on the key information. That is, the processor may send the acquired key information to the server, which further finds the historical information.

In 306, the server sends the historical information to the processor.

After receiving the key information, the server may find at least one piece of historical information associated with the key information in a storage space thereof based on the key information and send it to the processor. That is, the processor may receive the historical information sent by the server.

The association with the key information may mean that at least one parameter of the content of the historical information, the type of the historical information, the post time of the historical information, the post position of the historical information in the information display page is matched with the key information. For example, assuming that the key information includes the post time of the historical information, the historical information associated with the key information may refer to: the historical information posted at a time indicated by the key information. Assuming that the key information includes the type of historical information, the historical information associated with the key information may refer to: the historical information having a type as indicated by the key information.

Exemplarily, assuming that the key information sent by the processor to the server is "April 2017", the server may acquire all historical information posted in "April 2017" and send them to the processor.

By acquiring the historical information from the server in real time, the storage burden of the processor can be further reduced, and the reliability of the acquired information can be ensured. Without doubt, in the case that the processor stores the historical information locally, the processor may directly acquire the historical information locally based on the key information instead of acquiring the historical information from the server.

In step 307, the processor hides the navigation bar.

After acquiring the historical information, the processor may hide the navigation bar that may occupy the display area of the information display page, to facilitate the user to reliably view the historical information. For example, the navigation bar may be automatically minimized on the information display page. In the case that the user wants to trigger the navigation bar again, the user may trigger the processor by a second designated operation (such as, a double-click operation at a display position of the navigation bar) to display the navigation bar again on the information display page.

In addition, as the historical information acquired at one time may not be the historical information that the user ultimately wants to acquire, the processor may also need to perform a second finding again based on an operation of the user on the navigation bar. Therefore, to avoid hiding the navigation bar by mistake, after acquiring the historical information, the processor may hide the navigation bar in response to a touch operation on a position on the information display page other than on a position of the navigation bar. Alternatively, after acquiring the historical information, the processor may hide the navigation bar in the case that a duration during which no touch operation is executed on the information display page is detected to be greater than a duration threshold.

In step 308, the processor displays the historical information.

After acquiring the historical information, the processor may display the historical information synchronously on the current information display page of the client. For example, taking a sliding operation as the second target operation for the navigation bar as an example, the processor may synchronously display the historical information corresponding to the first candidate key information which is currently slid to on the information display page based on the sliding operation on the navigation bar. That is, the historical information displayed on the information display page is always synchronized with the first candidate key information that has been slid.

Combined with FIG. 6, assuming that the first candidate key information that the user currently slides to is "April 2017", the processor may synchronously display a plurality of historical information posted in "April 2017" on the information display page. Moreover, referring to FIG. 6, the plurality of historical information posted in "April 2017" may be sequentially displayed in an order that the post times are getting closer to a current time.

It should be noted that the order of the steps of the method for acquiring the historical information according to the embodiments of the present disclosure may be adjusted properly, or added or deleted accordingly as appropriate. For example, step 307 may be deleted as appropriate. Any method that can be easily conceived by one skilled in the art within the technical scope of the present disclosure shall fall within the protection scope of the present disclosure, and thus, the detailed description thereof will not be repeated.

In summary, the embodiments of the present disclosure provide a method for acquiring historical information. The method can display the content finder control on the information display page; determine, in response to an operation on the content finder control, the key information corresponding to the historical information to be found; and quickly acquire the historical information based on the key information. Therefore, the associated historical information may be displayed quickly. With the method, the efficiency in acquiring the historical information is high.

Another exemplary embodiment is implemented in a scenario of the client installed in the smart terminal device illustrated in FIG. 1 by taking the processor as an execution subject, and introduces the method for acquiring the historical information according to the embodiments of the present disclosure by taking a shortcut operation page as the content finder control as an example.

Figure 8:
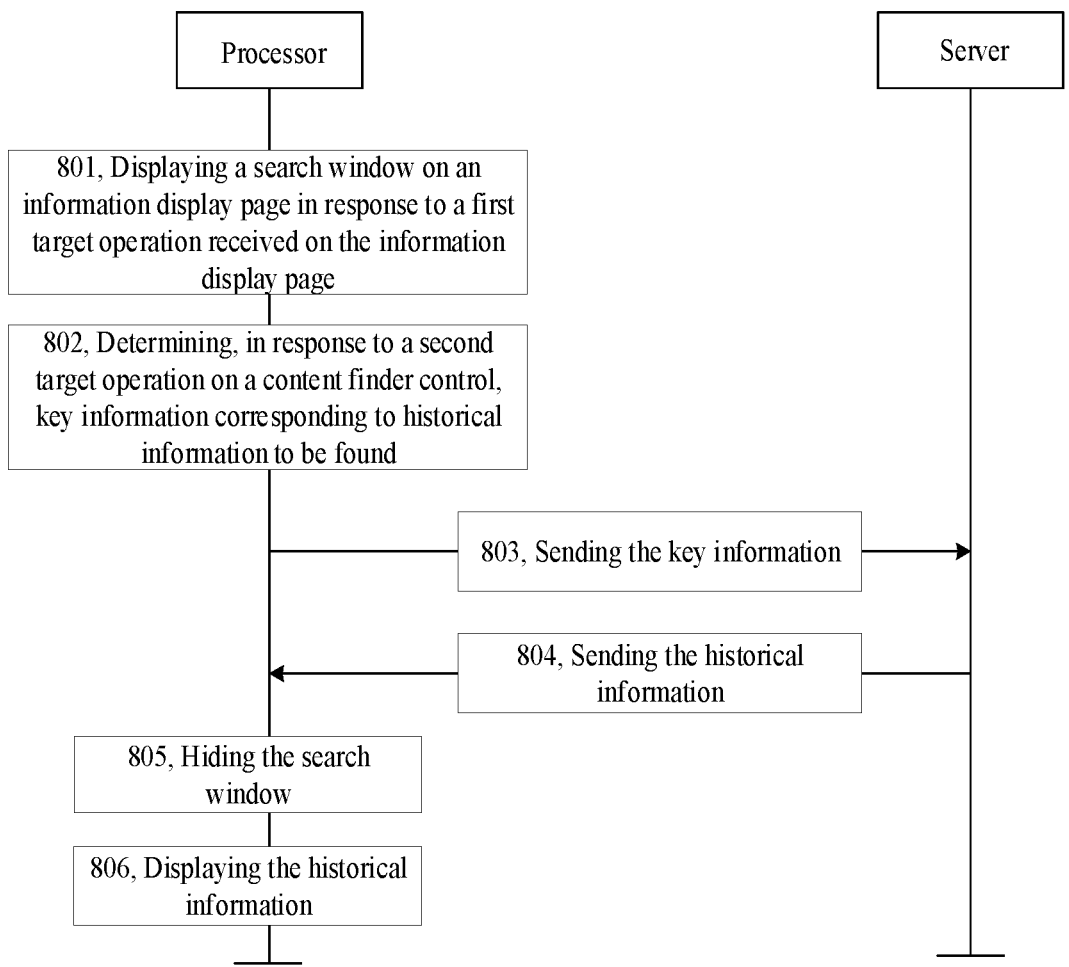
FIG. 8 is a flowchart of a method for acquiring historical information according to one or more embodiments of the present disclosure.

FIG. 8 is a flowchart of still another method for acquiring historical information according to an embodiment of the present disclosure. As illustrated in FIG. 8, the method may include the following steps.

In step 801, the processor displays a content finder control on the information display page in response to a first target operation received on an information display page.

Optionally, for an application scenario where the content finder control is a search window, the first target operation may include: a page-turning operation performed on the information display page at a speed greater than a speed threshold. In some embodiments, the page-turning operation may be clicking a page-turning icon or sliding or other page-turning operations. Taking sliding page-turning as an example, that is, in the case that a user wants to quickly find historical information of an information display page, the user may perform a quick sliding operation on the information display page to instruct the processor that the user needs to quickly find the historical information. For the processor, it needs to first acquire a sliding operation performed by the user on the information display page, then detect whether the speed of the sliding operation is greater than the speed threshold, and display the search window when the speed is greater than the speed threshold.

Figure 9:
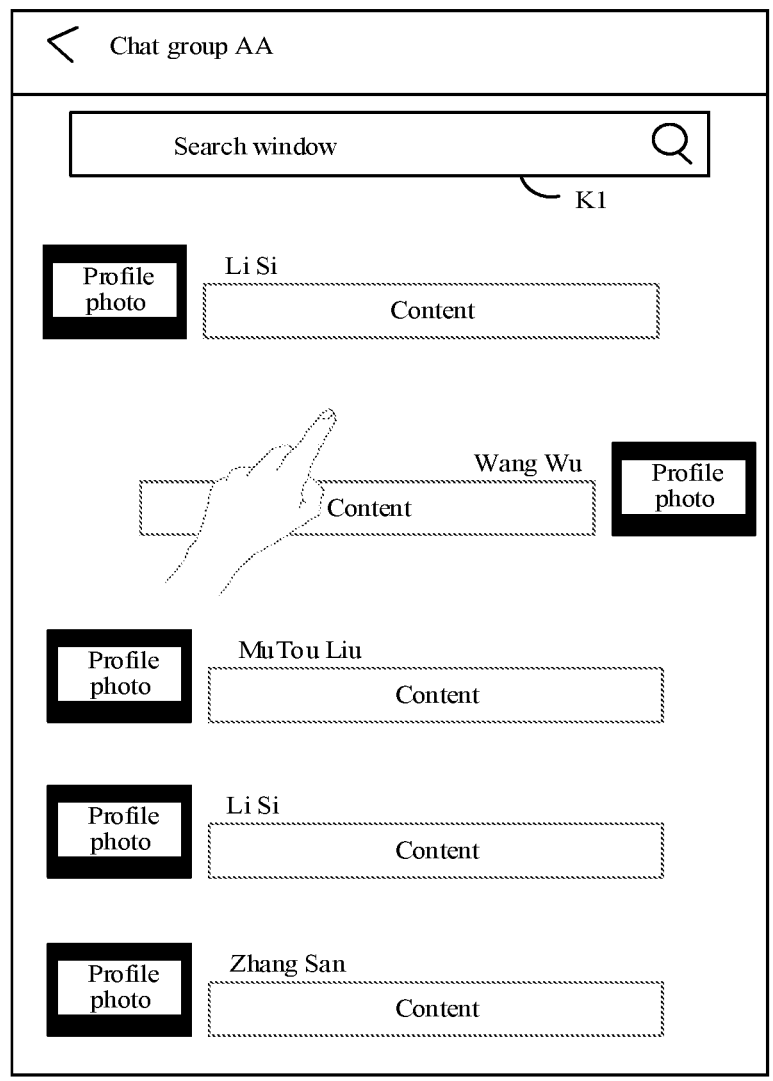
FIG. 9 is a schematic diagram of an interface of an information display page according to one or more embodiments of the present disclosure.

Exemplarily, FIG. 9 illustrates a schematic diagram of an interface of still another information display page by taking a chat page of a chat group AA as the information display page as an example. Referring to FIG. 9, when a user performs a sliding operation at a speed greater than the speed threshold on the chat page, the processor may display a search window K1 on the chat page of the client.

Exemplarily, the sliding operation may include: sliding up or down along an arrangement direction of a plurality of chat records displayed on the chat page. Moreover, the sliding operation may be an operation of sliding up or down at a fixed position of a chat window page by pressing, and staying at the currently pressed page when the pressing is released; or may be an operation of swinging up or down at a fixed position of the chat window page by clicking. Correspondingly, the magnitude of the speed threshold may also be flexibly set based on the sliding operation.

Figure 10:
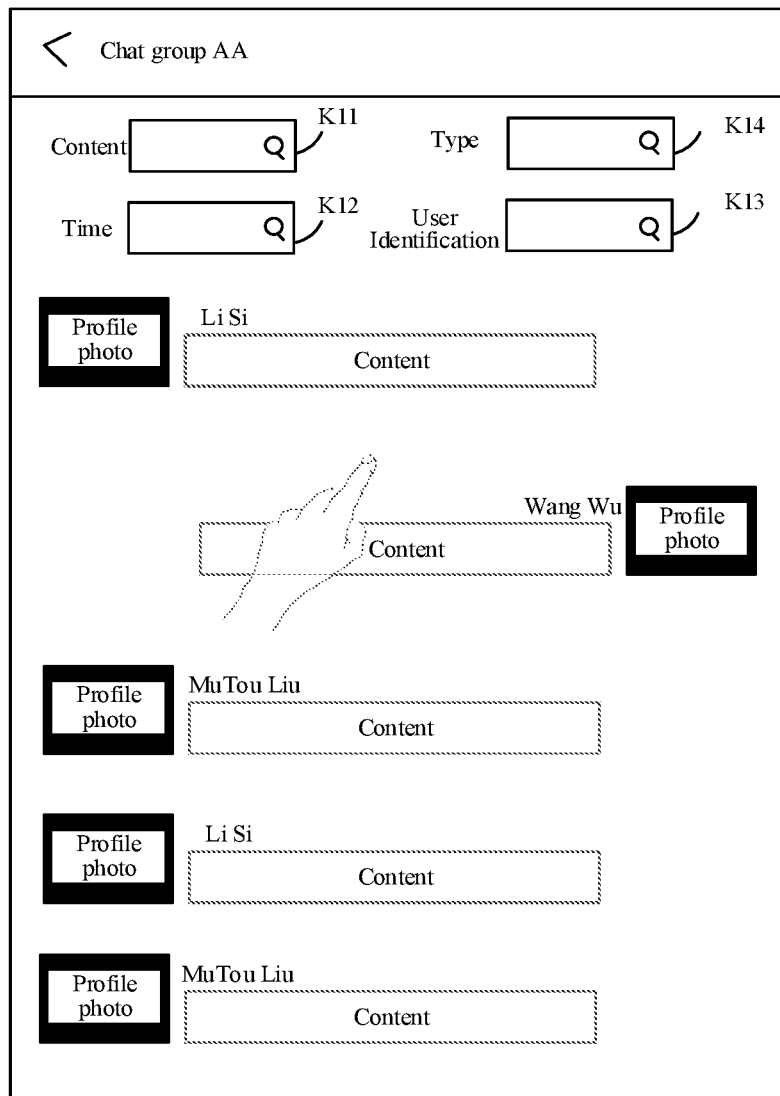
FIG. 10 is a schematic diagram of an interface of an information display page according to one or more embodiments of the present disclosure.

To further increase a finding efficiency and ensure a finding accuracy, with reference to FIG. 10, the search window may include at least one of the following search sub-windows.

A content search sub-window K11 is configured to receive content information of posted historical information. The content information may include at least one of a keyword and a picture.

A time search sub-window K12 is configured to receive a post time of the historical information. For this sub-window, a year/month/day navigation may be displayed directly. That is, the search sub-window may be in a form of "(year) (month) (day)".

A user identification search sub-window K13 is configured to receive a user identity posting the historical information. This search sub-window may be suitable for finding group chat records.

A type search sub-window K14 is configured to receive a post type of the historical information. The post type of the historical information may include at least one of a picture type, a text type, and a voice type.

In the case that the search window includes a plurality of search sub-windows, the processor may acquire a plurality of different categories of key information, and reliably find historical information based on the plurality of different categories of key information.

It should also be noted that the search sub-windows described above may be displayed on the information display page in a fixed or floated fashion. When the search sub-window is displayed in the floated fashion, the processor may flexibly adjust a display position of the search sub-window based on a movement operation of a user on the search sub-window.

In step 802, the processor determines key information corresponding to historical information to be found in response to a second target operation on the content finder control.

The second target operation may be an operation performed on the search window. Correspondingly, the processor may determine information received in the search window as the key information in response to the second target operation. Optionally, the second target operation may include: an information input operation performed by the user in the search window, or a fourth touch operation and a fifth touch operation.

In the case that the second target operation is the information input operation, the processor may directly determine the information input by the user into the search window as the key information. For example, combined with FIG. 9, assuming that the user enters "Apr. 1, 2017, Wang Wu" in the search window K1, the processor may directly determine "Apr. 1, 2017, Wang Wu" as the key information.

In the case that the second target operation is the fourth touch operation and the fifth touch operation, step 802 may include: displaying a plurality of second candidate key information by the processor in response to the fourth touch operation performed in the search window. Then, in response to the fifth touch operation on any second candidate key information of the plurality of second candidate key information, the processor displays the second candidate key information in the search window, and determines the second candidate key information as the key information. That is, the information received by the processor in the search window is the any second candidate key information selected by the user from the plurality of second candidate key information.

For each search sub-window included in the search window, the processor determines the key information similarly. Moreover, for each of the search sub-windows, a category of the second candidate key information displayed correspondingly by the search sub-window is a sub-category of the category of the search sub-window. For example, for the time search sub-window K12 with a category of "time", a category of the plurality of second candidate key information displayed by the processor in response to the fourth touch operation performed in the search sub-window may be a subcategory of "time", i.e., "calendar". That is, the plurality of second candidate key information may be a plurality of optional dates subordinate to a certain calendar. For the user identification search sub-window K13 with a category of "user identity", a category of each of the plurality of second candidate key information displayed by the processor in response to the fourth touch operation executed in the search sub-window may be a subcategory of "user identity", i.e., "specific user identification". That is, the plurality of second candidate key information may be a plurality of user identifications.

Exemplarily, the fourth touch operation may be a click operation or a long pressing operation performed in the search window. For example, assuming that a selection control is displayed in the search window, the fourth touch operation may be a click operation on the selection control displayed in the search window. The fifth touch operation may be a click operation or a long pressing operation on any second candidate key information.

Figure 11:
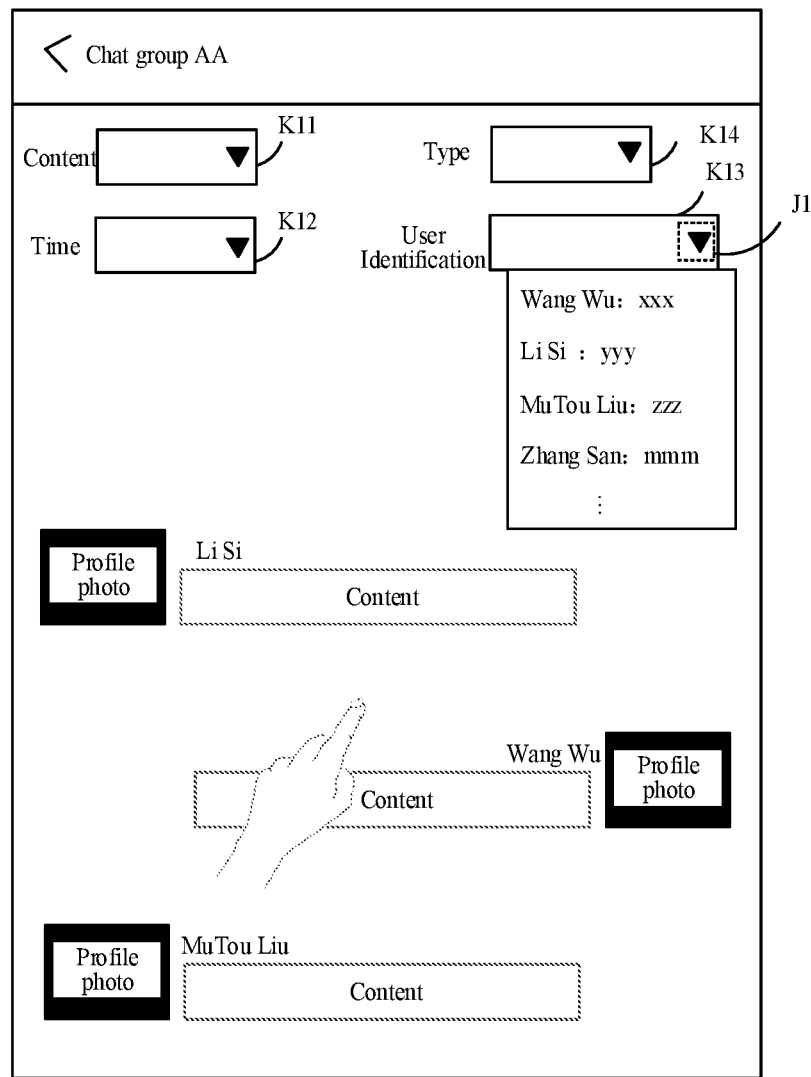
FIG. 11 is a schematic diagram of an interface of an information display page according to one or more embodiments of the present disclosure.

Exemplarily, combined with FIG. 11, assuming that the search window includes: the content search sub-window K11, the time search sub-window K12, the user identification search sub-window K13, and the type search sub-window K14, and each of the search sub-windows displays a triangular selection control J1, the fourth touch operation is a click operation on the selection control J1 in each of the search sub-windows, and the fifth touch operation is a click operation on any target candidate key information. Then, when a user clicks the selection control J1 displayed in the user identification search sub-window K13, the processor may first display a plurality of second candidate key information on the information display page for the user to select. Referring to FIG. 11, the plurality of second candidate key information displayed on the information display page are "Wang Wu: xxx, Li Si: yyy, MuTou Liu: zzz, Zhang San: mmm", and the like. When the user continues to click on the second candidate key information "Li Si: yyy", the processor may display the second candidate key information "Li Si: yyy" in the user identification search sub-window K13 on the information display page, and determine the second candidate key information "Li Si: yyy" as the key information.

In step 803, the server sends the key information to the server.

The implementation of this step may refer to the description of step 305, and is not described herein again.

In step 804, the server sends the historical information to the processor.

The implementation of this step may refer to the description of step 306, and is not described herein again. Moreover, in the case that the key information is a picture, the historical information acquired by the processor may be picture information similar to the picture, or may be a content similar to a content in the picture.

In step 805, the processor hides the search window.

The implementation of this step may refer to the description of the above step 307, and is not described herein again.

In step 806, the processor displays the historical information.

The implementation of this step may refer to the description of the above step 308, and is not described herein again.

It should be noted that the order of the steps of the method for acquiring the historical information according to the embodiments of the present disclosure may be adjusted properly, or added or deleted accordingly as appropriate. For example, step 805 may be deleted as appropriate. Any method that can be easily conceived by one skilled in the art within the technical scope of the present disclosure shall fall within the protection scope of the present disclosure, and thus, the detailed description thereof will not be repeated.

In summary, the embodiments of the present disclosure provide a method for acquiring historical information. The method can display the content finder control on the information display page; determine, in response to an operation on the content finder control, the key information corresponding to the historical information to be found; and quickly acquire and display the associated historical information based on the key information. Therefore, the efficiency of acquiring the historical information is improved.

It should be noted that the method for acquiring the historical information is illustrated in FIG. 3 and FIG. 8 may directly serve as an execution subject to execute, and the execution method may refer to the descriptions in FIG. 3 and FIG. 8, which is not described herein again.

Figure 12:
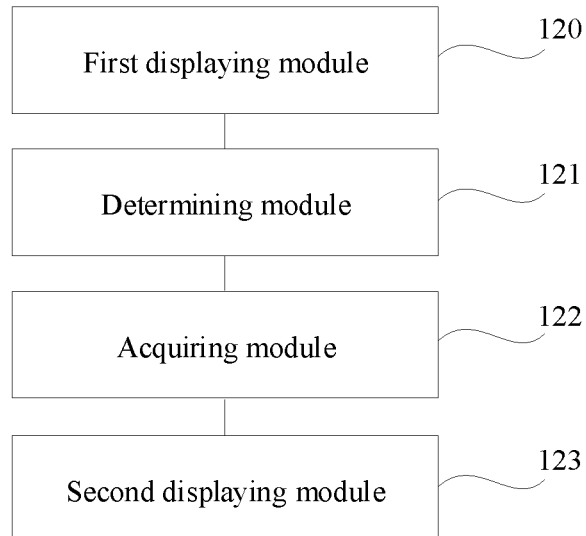
FIG. 12 is a block diagram of an apparatus for acquiring historical information according to one or more embodiments of the present disclosure.

FIG. 12 is a block diagram of an apparatus for acquiring historical information according to an embodiment of the present disclosure. As illustrated in FIG. 12, the apparatus may include:

a first displaying module 120 configured to display, in response to a first target operation received on an information display page, a content finder control on the information display page;

a determining module 121 configured to determine, in response to a second target operation on the content finder control, key information corresponding to historical information;

an acquiring module 122 configured to acquire historical information associated with the key information based on the key information;

a second displaying module 123 configured to display the historical information.

In an optional embodiment:

the content finder control may include a navigation bar displaying one or more first candidate key information. Correspondingly, the second target operation may include a first touch operation performed on the navigation bar to select one or more candidate key information.

Optionally, the determining module 121 may be configured to determine, in response to the first touch operation, the first candidate key information selected by the first touch operation as the key information corresponding to the historical information to be found.

Optionally, the first touch operation may include: selecting the candidate key information in a click mode or a sliding mode.

Optionally, at least one of the navigation bars may include: a plurality of navigation directories at different levels, wherein a plurality of first candidate key information of the same category are displayed in the navigation directory at each level, and the category of the first candidate key information displayed in the navigation directory at each level is a subcategory of a category of the first candidate key information displayed in the navigation directory at a previous level.

Optionally, the first displaying module 120 may be configured to display, in response to the first target operation received on the information display page, the navigation directory at a first level.

Figure 13:
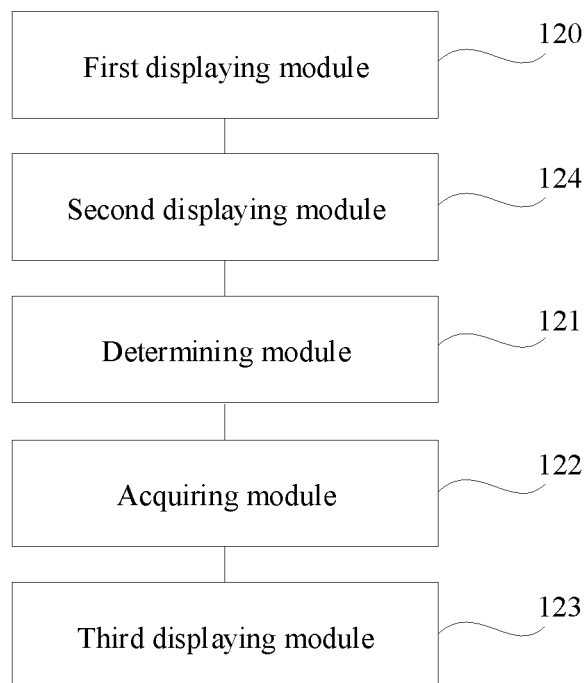
FIG. 13 is a block diagram of an apparatus for acquiring historical information according to one or more embodiments of the present disclosure.

FIG. 13 is a block diagram of another apparatus for acquiring historical information according to an embodiment of the present disclosure. As illustrated in FIG. 13, the apparatus may further include:

a third displaying module 124 configured to display, in response to a second touch operation on the navigation directory at any level among the plurality of navigation directories at different levels, the navigation directory at a next level.

Optionally, the second touch operation may include: a click operation or a combined operation on any one of the first candidate key information displayed in the navigation directory at any level. The combined operation may include: a long pressing operation, and a sliding operation in a direction that intersects an arrangement direction of the plurality of first candidate key information displayed in the navigation directory at any level.

Optionally, the category of the first candidate key information displayed in the navigation directory at each level may include: the post time of the historical information.

Optionally, each of the navigation bars may include: two navigation directories at different levels.

A category of each of the plurality of first candidate key information displayed in the navigation directory at the first level may be: a post year of the historical information. A category of each of the plurality of first candidate key information displayed in the navigation directory at second level may be: a post month of the historical information.

Figure 14:
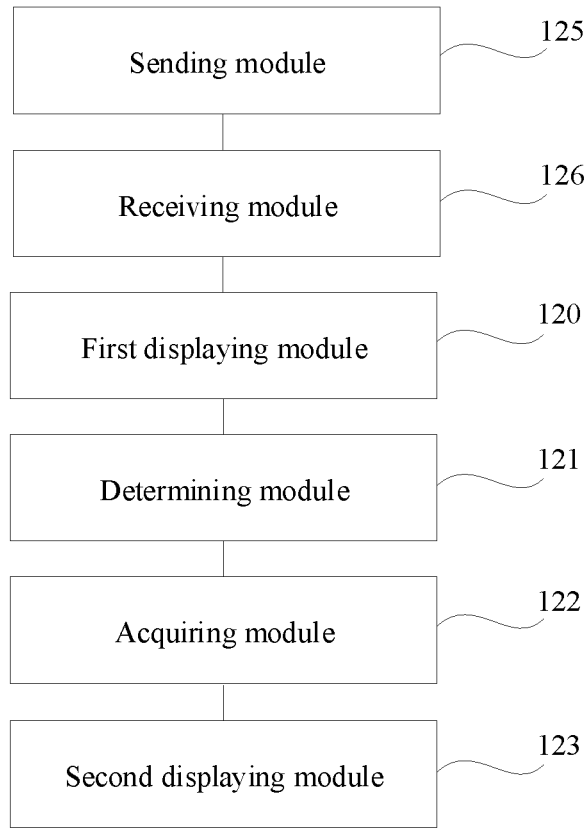
FIG. 14 is a block diagram of an apparatus for acquiring historical information according to one or more embodiments of the present disclosure.

Optionally, FIG. 14 is a block diagram of another apparatus for acquiring historical information according to an embodiment of the present disclosure. As illustrated in FIG. 14, the apparatus may further include:

a sending module 125 configured to send, before the content finder control is displayed on the information display page and in response to the first target operation received on the information display page, an acquisition request to a server. The acquisition request is configured to instruct the server to acquire the plurality of first candidate key information.

a receiving module 126 configured to receive the plurality of first candidate key information sent by the server.

Optionally, the information display page may include: a scroll bar. The first target operation may be a third touch operation on the scroll bar, and the third touch operation may include any one of a click operation, a long pressing operation, and a sliding operation.

Figure 15:
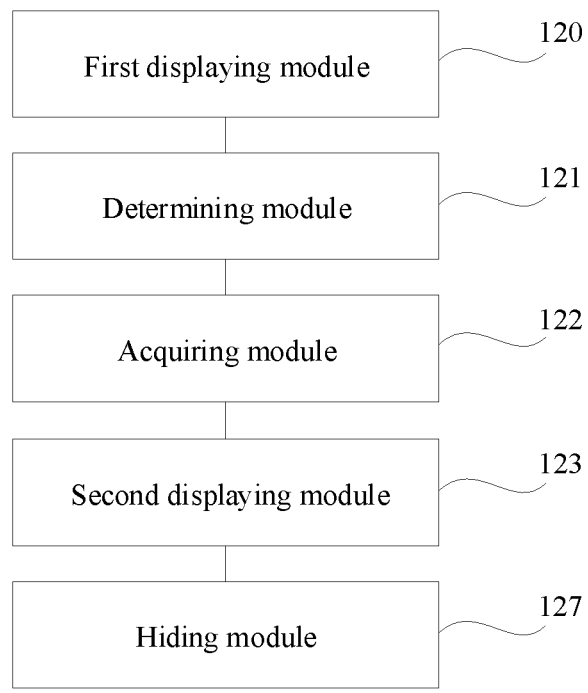
FIG. 15 is a block diagram of an apparatus for acquiring historical information according to one or more embodiments of the present disclosure.

Optionally, FIG. 15 is a block diagram of still another apparatus for acquiring historical information according to an embodiment of the present disclosure. As illustrated in FIG. 15, the apparatus may further include:

a hiding module 127 configured to hide the navigation bar after acquiring the historical information associated with the key information.

Optionally, the hiding module 127 may be configured to hide the navigation bar in response to a touch operation on a position on the information display page other than on a position of the navigation bar; or, hide the navigation bar in the case that a duration during which no touch operation is performed on the information display page is detected to be greater than a duration threshold.

In another optional embodiment:

the content finder control may include: a search window; and correspondingly, the second target operation may be an operation performed on the search window. The determining module 121 may be configured to determine, in response to the second target operation on the content finder control, the information received in the search window as the key information corresponding to the historical information to be found.

Optionally, the search window may include at least one of the following search sub-windows:

a content search sub-window is configured to receive content information of posted historical information, where the content information includes at least one of a keyword and a picture;

a time search sub-window is configured to receive a post time of the historical information;

a user identification search sub-window is configured to receive a user identity posting the historical information;

a type search sub-window is configured to receive a post type of the historical information, the post type of the historical information including at least one of a picture type, a text type, and a voice type.

Optionally, the second target operation may include: an information input operation performed in the search window; or, the second target operation may include: a fourth touch operation and a fifth touch operation. Correspondingly, the determining module 121 may be configured to display, in response to the fourth touch operation performed in the search window, a plurality of second candidate key information; and display, in response to the fifth touch operation targeting any second candidate key information of the plurality of second candidate key information, the second candidate key information in the search window, and determine the second candidate key information as the key information.

Optionally, the first target operation may further include: a page-turning operation performed on the information display page at a speed greater than a speed threshold.

Optionally, the acquiring module 123 may be configured to send key information to a server, and receive historical information sent by the server, the key information being configured to instruct the server to find historical information associated with the key information based on the key information.

In summary, the embodiments of the present disclosure provide an apparatus for acquiring historical information. The apparatus can display the content finder control on the information display page; determine, in response to an operation on the content finder control, the key information corresponding to the historical information to be found; and quickly acquire and display the associated historical information based on the key information. Therefore, with the apparatus, the efficiency in acquiring the historical information is high.

With respect to the apparatus in the embodiments above, the specific manner of respective modules to execute the operation has been described in detail in the embodiments related to this method, and a detailed description thereof will not be repeated here.

It should be noted that the apparatus for acquiring the historical information as claimed by FIG. 12 may be disposed in the client, or may be disposed in the processor.

An embodiment of the present disclosure further provides a system. The system may include: a processor and a touch display.

The touch display may be configured to: display an information display page; receive a first target operation of a user on the touch display; display a content finder control on the information display page; receive a second target operation of the user on the touch display; and display historical information found. The processor may be configured to: display, in response to the first target operation, the content finder control on the information display page; determine, in response to the second target operation on the content finder control, key information corresponding to historical information to be found; acquire historical information associated with the key information based on the key information; and display the historical information on the touch display.

An embodiment of the present disclosure further provides a system. The system may include: a processor and a touch display. The processor is configured to execute the method according to the present disclosure, and specifically, to at least execute the method for acquiring the historical information according to any one of the foregoing embodiments. The methods described above are not repeated herein.

Figure 16:
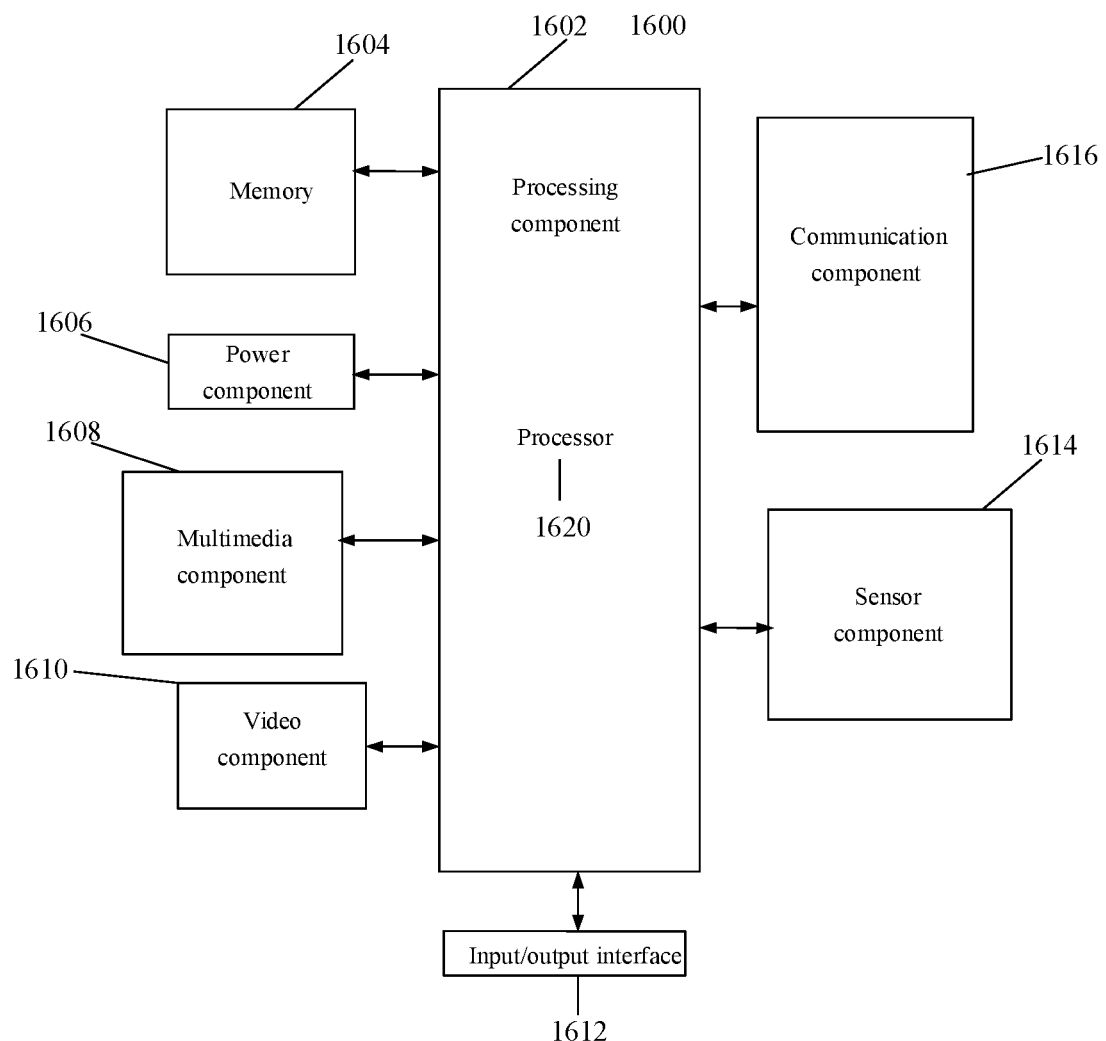
FIG. 16 is a schematic structural diagram of a smart terminal device according to one or more embodiments of the present disclosure.

FIG. 16 is a block diagram illustrating an apparatus 1600 for acquiring historical information according to an exemplary embodiment. For example, the apparatus 1600 may be a smartphone, a computer, a multimedia player, a smart TV, or the like.

Referring to FIG. 16, the apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 generally controls the overall operations of the apparatus 1600, such as the operations associated with display, telephone calls, data communications, camera operations, and recording operations. The processing component 1602 may include one or more processors 1620 to execute instructions to complete all or part of the steps of the above method. In addition, the processing component 1602 may include one or more modules to facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the apparatus 1600. Examples of such data include instructions for any applications or methods operated on the apparatus 1600, contact data, phonebook data, messages, pictures, videos, and the like. The memory 1604 may be implemented by any type of volatile or non-volatile storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1606 provides power to various components of the apparatus 1600. The power component 1606 may include a power management system, one or more power sources, and any other components associated with the generation, management, and distribution of power for the apparatus 1600. The multimedia component 1608 includes a screen providing an output interface between the apparatus 160 and a user.

In some embodiments, the screen may include a liquid crystal display (LCD) and a touch panel (TP). In the case that the screen includes the touch panel, the screen may be implemented as a touch screen to receive input signals from the user. The touch panel includes one or more touch sensors to sense touches, slides, and gestures on the touch panel. The touch sensors may not only sense a boundary of a touch or sliding action, but also detects a duration and a pressure associated with the touch or sliding operation.

In some embodiments, the multimedia component 1608 includes a front camera and/or a rear camera. The front camera and/or the rear camera may receive external multimedia data while the apparatus 1600 is in an operation mode, such as a photographing mode or a video mode. Each of the front camera and the rear camera may be a fixed optical lens system or may have a focal length and an optical zoom capability.

The audio component 1610 is configured to output and/or input audio signals. For example, the audio component 1610 includes a microphone (MIC). The microphone is configured to receive external audio signals when the apparatus 1600 is in an operation mode, such as a call mode, a recording mode, and a voice recognition mode. The received audio signals may be further stored in the memory 1604 or transmitted over the communication component 1616. In some embodiments, the audio component 1610 further includes a speaker for outputting the audio signals.

The I/O interface 1612 provides an interface between the processing component 1602 and peripheral interface modules, such as a keyboard, a click wheel and buttons. The buttons may include, but are not limited to, a home button, a volume button, a start button, and a lock button.

The sensor component 1614 includes one or more sensors to provide state assessments of the apparatus 1600 in various aspects. For example, the sensor component 1614 may detect an on/off state of the apparatus 1600, and relative positioning of components, which for example include a display and a keypad of the apparatus 1600. The sensor component 1614 may further detect a change in position of the apparatus 1600 or a component of the apparatus 1600, presence or absence of user contact with the apparatus 1600, an orientation or acceleration/deceleration of the apparatus 1600, and a change in temperature of the apparatus 1600. The sensor component 1614 may include a proximity sensor configured to detect the presence of a nearby object when there is no physical contact. The sensor component 1614 may further include an optical sensor, such as a complementary metal-oxide-semiconductor (CMOS) or charge-coupled device (CCD) image sensor, for use in an imaging application. In some embodiments, the sensor component 1614 may further include an acceleration sensor, a gyroscope sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as Wi-Fi, 2G or 3G, or a combination thereof. In an exemplary embodiment, the communication component 1616 receives broadcast signals or broadcast-related information from an external broadcast management system over a broadcast channel. In an exemplary embodiment, the communication component 1616 further includes a near-field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 1600 may be implemented with one or more application-specific integrated circuits (ASICs), digital signal processors (DSPs), digital signal processing devices (DSPDs), programmable logic devices (PLDs), field-programmable gate arrays (FPGAs), controllers, micro-controllers, microprocessors, or other electronic elements, for executing the method for acquiring the historical information as illustrated in any one of FIG. 2, FIG. 3, and FIG. 8.

In an exemplary embodiment, a computer-readable storage medium including at least one instruction (such as a memory 1604 including at least one instruction) is further provided. The at least one instruction may be executed by the processor 1620 of the apparatus 1600 to complete the methods described above.

The processor 1620 is configured to execute the method according to the embodiments of the present disclosure, and specifically, to at least execute the method for acquiring the historical information according to any one of the foregoing embodiments. The methods described above will not be repeated here anymore.

For example, the non-transitory computer-readable storage medium may be a read-only memory (ROM), a random-access memory (RAM), a CD-ROM, a magnetic tape, a floppy disk, an optical data storage device, and the like.

A non-volatile computer-readable storage medium stores at least one instruction. The computer-readable storage medium, when executed by the processor of the apparatus 1600, enables the apparatus 1600 to execute the method for acquiring the historical information as described above.

It should be understood that the term "a plurality" mentioned herein refers to two or more than two. The term "and/or" describes an association relationship between associated objects, indicating that there may be three types of relationships. For example, A and/or B may indicate the following three cases: A exists alone, both A and B exist, or B exists alone. The character "/" generally indicates an "or" relation between front and back associated objects.

Described above are merely optional embodiments of the present disclosure, and are not intended to limit the present disclosure. Within the spirit and principles of the present disclosure, any modifications, equivalent substitutions, improvements, and the like shall fall within the protection scope of the present disclosure.

What is claimed is:

1. A method for acquiring historical information, comprising:
    displaying, in response to a first target operation received on an information display page, a content finder control on the information display page, wherein the information display page comprises a scroll bar, and the first target operation is a third touch operation on the scroll bar;
    determining, in response to a second target operation on the content finder control, key information corresponding to historical information to be found, wherein the content finder control comprises at least one navigation bar, the navigation bar displaying at least one first candidate key information; and the second target operation comprises a first touch operation performed on the navigation bar to select one or more of the at least one first candidate key information;
    acquiring historical information associated with the key information based on the key information; and
    displaying the historical information;
    wherein determining, in response to the second target operation on the content finder control, the key information corresponding to the historical information to be found comprises:
    determining, in response to the first touch operation, the first candidate key information selected by the first touch operation as the key information corresponding to the historical information to be found;
    and wherein the navigation bar comprises a plurality of navigation directories at different levels, wherein a plurality of first candidate key information of the same category are displayed in the navigation directory at each level, and the category of the first candidate key information displayed in the navigation directory at each level other than a first level is a subcategory of a category of the first candidate key information displayed in the navigation directory at a previous level;
    displaying, in response to the first target operation received on the information display page, the content finder control on the information display page comprises:
        displaying, in response to the first target operation received on the information display page, the navigation directory at a first level; and
    the method further comprises:
    displaying, in response to a second touch operation on the navigation directory at any level among the plurality of navigation directories at different levels, the navigation directory at a next level.

2. The method according to claim 1, wherein the first touch operation comprises: selecting the first candidate key information in a click mode or a sliding mode.

3. The method according to claim 1, wherein the second touch operation comprises: a click operation or a combined operation on any one of the first candidate key information displayed in the navigation directory at any level;
   wherein the combined operation comprises: a long pressing operation, and a sliding operation in a direction that intersects an arrangement direction of the plurality of first candidate key information displayed in the navigation directory at any level.

4. The method according to claim 1, wherein the category of the first candidate key information displayed in the navigation directory at each level comprises: a post time of the historical information.

5. The method according to claim 4, wherein the navigation bar comprises two navigation directories at different levels;
   wherein a category of each of the plurality of first candidate key information displayed in the navigation directory at the first level is: a post year of the historical information; and
   a category of each of the plurality of first candidate key information displayed in the navigation directory at a second level is: a post month of the historical information.

6. The method according to claim 1, wherein before displaying the content finder control on the information display page, the method further comprises:
   sending, in response to the first target operation, an acquisition request to a server, wherein the acquisition request is configured to instruct the server to acquire the plurality of first candidate key information; and
   receiving the plurality of first candidate key information sent by the server.

7. The method according to claim 1, wherein the third touch operation comprises any one of a click operation, a long pressing operation, and a sliding operation.

8. The method according to claim 1, wherein after acquiring the historical information associated with the key information based on the key information, the method further comprises:
   hiding the at least one navigation bar.

9. The method according to claim 8, wherein hiding the at least one navigation bar comprises:
   hiding the at least one navigation bar in response to a touch operation on a position on the information display page other than on a position of the at least one navigation bar;
   or, hiding the at least one navigation bar in the case that a duration during which no touch operation is performed on the information display page is detected to be greater than a duration threshold.

10. The method according to claim 1, wherein acquiring the historical information associated with the key information based on the key information comprises:
   sending the key information to a server, the key information being configured to instruct the server to find the historical information associated with the key information based on the key information; and
   receiving the historical information sent by the server.

11. A non-volatile computer-readable storage medium storing at least one instruction therein, wherein the computer-readable storage medium, when operating on a computer, enables the computer to perform a method for acquiring the historical information comprising:
   displaying, in response to a first target operation received on an information display page, a content finder control on the information display page, wherein the information display page comprises a scroll bar, and the first target operation is a third touch operation on the scroll bar;
   determining, in response to a second target operation on the content finder control, key information corresponding to historical information to be found, wherein the content finder control comprises at least one navigation bar, the navigation bar displaying at least one first candidate key information; and the second target operation comprises a first touch operation performed on the navigation bar to select one or more of the at least one first candidate key information;
   acquiring historical information associated with the key information based on the key information; and
   displaying the historical information;
   wherein determining, in response to the second target operation on the content finder control, the key information corresponding to the historical information to be found comprises:
   determining, in response to the first touch operation, the first candidate key information selected by the first touch operation as the key information corresponding to the historical information to be found;
   and wherein the navigation bar comprises a plurality of navigation directories at different levels, wherein a plurality of first candidate key information of the same category are displayed in the navigation directory at each level, and the category of the first candidate key information displayed in the navigation directory at each level other than a first level is a subcategory of a category of the first candidate key information displayed in the navigation directory at a previous level;
   displaying, in response to the first target operation received on the information display page, the content finder control on the information display page comprises:
   displaying, in response to the first target operation received on the information display page, the navigation directory at a first level; and
   the method further comprises:
   displaying, in response to a second touch operation on the navigation directory at any level among the plurality of navigation directories at different levels, the navigation directory at a next level.

12. A system, comprising: a processor and a touch display, wherein
   the touch display is configured to: display an information display page; receive a first target operation of a user on the touch display; display a content finder control on the information display page; receive a second target operation of the user on the touch display; and display historical information found, wherein the information display page comprises a scroll bar, and the first target operation is a third touch operation on the scroll bar, and the content finder control comprises at least one navigation bar, the navigation bar displaying at least one first candidate key information; and the second target operation comprises a first touch operation performed on the navigation bar to select one or more of the at least one first candidate key information; and
   the processor is configured to: display, in response to the first target operation, the content finder control on the information display page; determine, in response to the first touch operation, the first candidate key information selected by the first touch operation as the key information corresponding to the historical information to be found; acquire historical information associated with the key information based on the key information; and display the historical information on the touch display;

and wherein the navigation bar comprises a plurality of navigation directories at different levels, wherein a plurality of first candidate key information of the same category are displayed in the navigation directory at each level, and the category of the first candidate key information displayed in the navigation directory at each level other than a first level is a subcategory of a category of the first candidate key information displayed in the navigation directory at a previous level;

the processor is further configured to: display, in response to the first target operation received on the information display page, the navigation directory at a first level; and display, in response to a second touch operation on the navigation directory at any level among the plurality of navigation directories at different levels, the navigation directory at a next level.

* * * * *